Aug. 30, 1949.　　　　　M. H. ITTNER　　　　　2,480,471
COUNTERCURRENT HYDROLYSIS OF FAT
Filed Oct. 27, 1944

INVENTOR
Martin Hill Ittner
BY
ATTORNEYS

Patented Aug. 30, 1949

2,480,471

UNITED STATES PATENT OFFICE 2,480,471

COUNTERCURRENT HYDROLYSIS OF FAT

Martin Hill Ittner, Jersey City, N. J., assignor to Colgate-Palmolive-Peet Company, Jersey City, N. J., a corporation of Delaware Continuation of application Serial No. 240,037, November 12, 1938, which is a division of application Serial No. 83,991, June 6, 1936. This application October 27, 1944, Serial No. 560,641

4 Claims. (Cl. 260—415)

This invention relates to improved apparatus for the aqueous saponification or hydrolysis of fats and fatty oils to produce fatty acids and glycerine.

Fats and fatty oils as they occur in nature consist of triglycerides, that is, compounds in which one molecule of glycerine has been combined with three molecules of fatty acid with the elimination of three molecules of water. It is the object of this invention to provide an improved apparatus for splitting or hydrolyzing such triglycerides into fatty acids and glycerine, with the production of a relatively concentrated aqueous solution of glycerine and relatively pure fatty acids uncontaminated by decomposition products or tars or by catalytic materials or reaction products of catalytic materials.

The saponification of fats and oils with caustic alkali in excess, or in the proper proportions to combine with the fatty acids produced, has long been used in the manufacture of soap. Glycerine is produced at the same time that the soap is produced, but the removal and purification of the glycerine involves a number of relatively expensive operations.

The aqueous hydrolysis of fats and fatty oils, by the use of water and catalysts of various types has also been known and used for a long time. Included among the catalysts which have been used are lime, magnesia, and other basic materials, and sulphuric acid and other acids. Aqueous hydrolysis with the aid of such catalysts has generally been carried out in an autoclave in the presence of liquid water and steam under moderate pressure, such as pressures from 120 to 150 pounds per square inch while employing agitation from jet steam or mechanical stirrer to promote surface contact between fat and water.

Another method of accomplishing the aqueous hydrolysis of fats and fatty oils is the well known Twitchell process in which the fat or fatty oil is brought into contact with water and one of the so-called Twitchell reagents, which are acid catalysts which possess the property of emulsifying the fat or fatty oil and of dissolving to some extent in the fat or fatty oil, at the boiling point of water.

It is also well known that fats and fatty oils hydrolyze to some extent when in contact with water alone at relatively low temperatures, e. g., temperatures up to about the boiling point of water. This hydrolysis, while sufficiently fast to cause fats and fatty oils stored in the presence of moisture to deteriorate, is too slow to be of value for the commercial hydrolysis of fats and fatty oils to produce fatty acids and glycerine.

It has also been proposed to accomplish the aqueous hydrolysis of fats and fatty oils by heating the fats or fatty oils together with liquid water at comparatively high temperatures, and at pressures sufficient to prevent the formation of steam in contact with the mixture being heated, with the production of an aqueous solution of glycerine and the fatty acid.

In all such procedures which have been used or proposed heretofore, balanced reactions, which go to an equilibrium, result, and the saponification or hydrolysis, as the case may be, is incomplete, except with repetitions of the treatment. Except under very favorable conditions, the saponification or hydrolysis seldom proceeds as far as 90% completion. By removing the aqueous solution of glycerine formed and subjecting the fatty matter to repetitions of the treatment, the saponification or hydrolysis may be brought up to 95% of completion, or, under favorable conditions, somewhat higher. Furthermore, agitation and protracted treatment are required to so complete the reaction, and the heat losses which take place because of the repetition of the treatment and the length of the treatment become excessive. If water is not used freely in carrying out the reaction, the saponification or hydrolysis is retarded; and if water is used freely, or if many changes of water are used, the glycerine obtained is objectionably diluted, and expensive to evaporate and concentrate. Also, where the treatment is prolonged or repeated, there is an increase in the darkening of the fatty acids and the formation of undesirable tars. This is particularly true in the processes in which catalysts are used.

Where catalysts are used to hasten the saponification or hydrolysis, the products produced are contaminated by the catalysts and special treatment is required to remove the catalysts.

As an illustration of the fact that these hydrolyses or saponifications as commonly carried out are balanced or reversible reactions which do not go to completion even at high temperatures and pressures, I have determined that if a mixture containing 35 parts of pure neutral tallow and 25 parts of pure water is heated under pressure in an autoclave to about 255° C. for about 3 hours, or until an equilibrium is reached, a product is obtained which is about 92% hydrolyzed. If a mixture containing glycerine and pure tallow fatty acids, in the exact amounts which would be obtained by complete hydrolysis of 35 parts of pure neutral tallow, and sufficient water to make the total 60 parts is heated in an autoclave to 255° C. for 3 hours and at the same pressure as employed in the test described above, an esterification takes place with the formation of glycerides and with the production of a mixture about 92% hydrolyzed. Thus the same equilibrium is arrived at whether neutral tallow and water are heated together, or whether tallow fatty acids, glycerine and water are heated together. Similar experiments with coconut oil indicate that the same phenomenon occurs, except that a larger proportion of water is required for the same degree of hydrolysis. At lower temperatures and pressures, longer periods are required for the reaction to reach an equilibrium point, and at equilibrium the hydrolysis is considerably less.

The fact that this reaction is one which proceeds to an equilibrium, and not to completion, is in accordance with the well known law of mass action. Furtherfore, as is well known, the use of catalysts in speeding up the reactions does not effect the final equilibrium reached, but merely causes the reaction to reach this equilibrium in a shorter period of time.

By the present invention I provide apparatus for the substantially complete aqueous hydrolysis of fats and fatty oils in a single operation and within a relatively short time and with marked heat economy, with the production of relatively concentrated aqueous glycerine and fatty acids uncontaminated by catalysts or other objectionable impurities requiring special treatment for their removal, and without the objectionable decomposition and formation of tars heretofore frequently encountered when carrying the hydrolysis even to a lesser extent than that to which I carry it.

I have found that, although the solubility of water in fats and fatty acids is very slight at low temperatures, and at temperatures as high as the boiling point of water, at atmospheric pressure or even considerably higher, the solubility of water in fats and fatty oils and fatty acids in the presence of excess water, under sufficient pressure to prevent the vaporization of the water, increases slowly up to about 200° C. and then increases more rapidly at higher temperatures. In all cases, to dissolve any considerable amount of water in the fats or fatty acids a pressure in excess of the pressure of saturated water vapor at the temperature selected must be used. For example, at a temperature of 235° C. and an absolute pressure of 700 pounds per square inch, fatty acids from coconut oil will dissolve about 17% of their weight of water in the presence of excess liquid water. The same fatty acids, in the presence of excess liquid water, and at a temperature of 245° C. and an absolute pressure of 800 pounds per square inch dissolve about 20% of water. At a temperature of about 287° C. and a pressure in excess of 70 atmospheres, these fatty acids blend freely with more than their own weight of water with the formation of a single, clear liquid phase. Other commercial fatty acids, such as those from tallow and palm oil, behave in a similar manner and have an increased power to dissolve water at elevated temperatures and pressures such as those above referred to.

In using the apparatus of the present invention, I subject the fat, fatty oil, or mixtures thereof to be hydrolyzed to the action of liquid water at high temperatures and pressures. The process is carried out by contacting the fatty material with the water by countercurrent flow under such conditions as to insure intimate contact of the fatty material with the water, with prevention or minimizing of emulsification, and with the use of temperatures and pressures sufficiently high to insure that an amount of water appreciably in excess of the amount of water required for the complete hydrolysis of the fatty material to fatty acids and glycerine is dissolved in the fatty material, but not so high as to produce miscibility of the fatty material and water, or to cause the fatty material to dissolve all of the water used with the production of a single liquid phase. The amount of water required to be dissolved in the fatty material varies with different fatty materials, but in each case, for the rapid hydrolysis of the present invention, must be apreciably greater than the amount required for hydrolysis. For example, coconut oil for complete hydrolysis requires about 8.3% of its own weight of water and tallow requires about 6.4% of its own weight of water. For this rapid hydrolysis of these fats, the effective conditions of temperature and pressure are such that the fatty material dissolves considerably more water than these amounts. The water dissolved in the fat affects the saponification and any excess water not dissolved washes out glycerine, so that the saponification may thus be carried to completion.

The total amount of water used must be sufficient not only to provide the necessary amount of water for the hydrolysis, and any excess water dissolved in the fatty material at the high temperatures and pressure employed, but also sufficient to dissolve the glycerine formed and remove it from the fatty material as an aqueous solution. When using the apparatus, I can obtain glycerine in aqueous solutions of concentrations ranging from 15% or less to 50% or somewhat more, directly, and the amount of water used in carrying out my process should be such as to give a glycerine solution of the desired concentration.

In carrying out this process, with countercurrent flow of the fatty material to be saponified and the water, the pressure maintained in the apparatus is well in excess of the pressure of saturated steam at the highest temperature selected, so that ordinary variations in temperature and pressure cannot result in the vaporization of water within the apparatus to interfere with the operation of the process. The apparatus is kept completely full of liquid, that is, fatty material and water or aqueous glycerine.

It is important, in carrying out the process, to provide for the proper separation of the aqueous glycerine from the fatty material at the point where the aqueous glycerine is removed from the apparatus, and to provide for the proper separation of the fatty material, that is, the fatty acids resulting from the hydrolysis, from the water at the point where the fatty acids are withdrawn from the apparatus. This is accomplished by providing settling spaces or zones adjacent to the parts of the apparatus at which these materials are removed, so that where the aqueous glycerine is separated or removed from the apparatus, there is provided a quiescent zone in which the aqueous glycerine may separate from the fatty material to permit the removal of aqueous glycerine free from fatty material except in so far as the fatty material may be dissolved in the aqueous glycerine; otherwise, the incoming fatty material will readily emulsify with and be largely removed by the outwardly flowing current of aqueous glycerine when the equipment is being used at an economic rate of operation as the fatty material is very prone to objectionable emulsification in its early stages of hydrolysis. Similarly, at the point where the fatty acids are removed from the apparatus, there is provided a quiescent zone where the fatty acids may separate from the water, and be removed without removing water at the same time, except in so far as the water may be dissolved in the fatty material. Because of the fact that the temperatures and pressures are sufficiently high in my process to cause a very considerable amount of water to actually dissolve in the fatty matter, agitation is not needed to promote saponification but leads to emulsification that is generally considered as desirable, if not necessary, to increase contact in other methods employing temperatures and pressures not sufficiently high to cause a considerable degree of solubility of water in the fatty material. Emulsification in any part of the apparatus lessens the efficiency of the process and emulsification of inflowing fat with aqueous glycerine or of outflowing fatty acids with inflowing water besides disturbing the smooth operation of the process also introduces an indefinite and irregular factor in the proportions of reacting materials remaining in the apparatus.

While the process can be carried out over a fairly wide range of temperatures, which varies with different fatty materials, and over a fairly wide range of pressures, which more or less depends upon the temperatures selected, the temperatures used, and the corresponding pressures used, must be such that two separate and distinct liquid phases are maintained within the apparatus, one phase being the fatty material, that is, the fat or fatty oil, or the fatty acids, or partially hydrolyzed fatty material, containing a proportion of dissolved water somewhat greater than the amount of water required for the complete hydrolysis of the fatty material, and the other phase consisting of water or aqueous glycerine, sufficient in amount to effectively wash out the glycerine from the fatty material and carry it through the apparatus, to be removed as aqueous glycerine ranging in concentrations from 15% or less up to 50% or more. Stirring or emulsification defeats the washing by preventing the ready separation of the aqueous glycerine phase from the fatty phase and efficient washing out of glycerine. The pressure selected depends upon the temperature and must be sufficient to maintain the material in a liquid state with no vaporization, and should be considerably in excess of the pressure of saturated steam at the temperature selected, to prevent vaporization of water if a slight drop in pressure or increase in temperature takes place, and to favor solution of water in the fatty material.

While no definite temperature limits can be given for carrying out the process, inasmuch as the temperatures vary with different fats or fatty oils, I have found that coconut oil, for example, can be advantageously treated at temperatures of around 235° C. or 245° C. and at pressures ranging about 250 pounds, more or less, in excess of the pressure of saturated steam at these temperatures, and that other fats and fatty oils may be advantageously treated at similar temperatures and approximately similar excess pressures. At temperatures of about 287° C. or higher and correspondingly high pressures, I find that the process cannot be carried out with coconut oil, as at these high temperatures and pressures coconut oil fatty acids blend freely with more than their own weight of water to form a single clear liquid phase, instead of the two phases required for the proper operation of my process. Similarly, with each fat or fatty oil, there is an upper temperature limit beyond which the solubility of the water in the fatty material is too great to permit the process to be carried out.

In general, I find that temperatures somewhat above about 200° C., or a little below 200° C., are satisfactory, in that at such temperatures the solubility of the water in the fatty material is quite appreciable and is in excess of the amount required for the hydrolysis of the fat or fatty oil, but is not so great as to cause the formation of a single liquid phase in the apparatus or to render the water so soluble in the fatty material as to preclude the proper washing out of the glycerine, at least with a reasonable amount of water. At lower temperatures, water is not sufficiently soluble in the fatty material to allow the process to be economically carried out, and the desired hydrolysis cannot be obtained at such lower temperatures in apparatus which does not depend upon mixing and large surface contact, at least in a reasonably short time and with the production of concentrated aqueous glycerine substantially free from fatty material.

In the apparatus of the invention, there is provided one or more suitable pressure vessels made of stainless steel or other suitable material having the necessary strength and resistance to the corrosive action of fatty acids and water at high temperatures and pressures and of sufficient strength to withstand the high pressures used with an ample margin of safety. The arrangement of the apparatus is such that the fatty material and water or aqueous glycerine, which flow countercurrently, are in intimate contact over a relatively long path and do not have a tendency to emulsify to any great extent. It is advantageous to cause the fatty material to flow upwardly through the vessel or vessels while the water or aqueous glycerine flows downwardly in intimate contact with it. Where a single pressure vessel is used, it may be provided on the inside with a number of trays or other suitable devices to insure intimate contact of the fatty material and the water or aqueous glycerine and to insure that this intimate contact is sufficiently prolonged to provide the desirable washing of glycerine from the fatty material which leads to the substantially complete hydrolysis of the present invention. Where a plurality of pressure vessels is used, the trays or other devices are not necessary, as the length of the path over which the materials flow in contact is sufficient to accomplish the necessary intimacy and length of contact, but trays or similar devices may be provided with advantage if desired.

The apparatus is also provided with suitable heat exchangers, so that the heat contained in the outgoing fatty acids and glycerine solution may be used for the preheating of the water and fatty material fed to the apparatus, and with another heater or heaters between the heat exchangers and the apparatus to heat the fat or fatty oil and water being supplied to the apparatus to the necessary high temperature. Diphenyl heaters or high pressure steam heaters or other suitable heating means may be advantageously used for this purpose. Suitable unitary heating units, such as electrical heaters properly placed around the exterior of the apparatus so that heat can be supplied to the apparatus where desired and in proper amounts to supply that lost by radiation and the like, are also advantageously provided. The apparatus is also provided with efficient insulation to minimize heat losses.

The apparatus is also suitably provided with pumps to introduce the water and fatty oil or fat under the high pressure used, and with suitable gauges and thermometers and suitable safety devices such as safety valves and the like to control the pressure and temperature within the apparatus.

It is advantageous to maintain the apparatus nearly full of the lighter fatty material and to maintain below the fatty material a settling zone for the separation of the aqueous solution from the fatty material. The apparatus is therefore provided with a suitable means of determining the position of the interface between the fatty material and the settling zone containing the quiescent aqueous glycerine near the point where the aqueous glycerine is removed, and near the point where the fat or fatty oil is introduced. The determination of the location of the oil or fat and water interface may be accomplished by means of a gauge glass suitably located near the bottom of the apparatus, or by providing a number of small faucets or outlets near the bottom of the apparatus in vertical series.

The invention will be further illustrated by reference to the attached drawings, which illustrate an apparatus embodying the invention.

Figure 1:
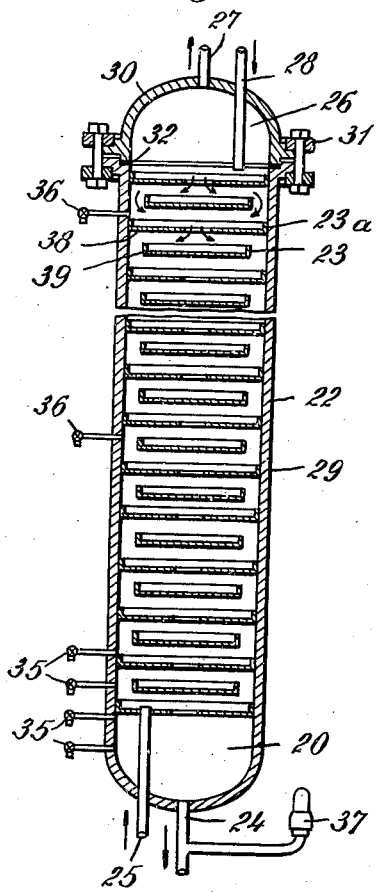
Fig. 1 is a cross-sectional view of a pressure vessel which embodies the invention showing an arrangement of trays within the vessel to provide a labyrinthal path for the material.

One suitable construction of the interior of a pressure vessel is illustrated conventionally in Fig. 1, the parts not being to scale. In this figure the vessel 22 may be, for example, two feet in diameter and fifteen feet high and may be made of suitable pressure-resistant and corrosion-resistant material, such as stainless steel. It is shown as provided with a series of trays 23 and 23a, with the alternate trays 23a having a diameter the same as or somewhat less than the interior diameter of the vessel, and intermediate trays 23 of smaller diameter, as shown. These trays may be spaced, for example, about one inch apart, more or less, but are shown as proportionately further apart, for convenience of illustration. These trays are suitably supported by rods or other devices (not shown) and are so constructed and arranged as to cause the material passing through the vessel to follow labyrinthian paths to increase the efficiency of the excess liquid water in washing glycerine from the fatty acids.

The alternate trays 23 are shown as of materially less diameter than the inner diameter of the vessel and as provided with rims at their outer peripheries over which the material flowing downwardly, that is, the aqueous glycerine or water, must flow; while the other trays 23a which are shown as having the same diameter as the inner diameter of the vessel, but which may advantageously have a somewhat smaller diameter to allow for clearance and expansion, are also provided with outer peripheral rims and with openings at the center through which the water or glycerine must flow in its downward path. The fatty material, rising through the vessel, follows the reverse path.

At the bottom of the vessel is shown the settling zone 20, in which the aqueous glycerine is separated from the fatty material. The aqueous glycerine, after proper separation, is removed through outlet 24, while the fatty material is fed to the apparatus through inlet 25 to a point advantageously above the lower trays and above the interface of the fatty material and the aqueous glycerine or water in the settling zone.

A somewhat similar zone 26 is provided at the top of the vessel for the separation of the fatty material from admixed water, so that the fatty material may be removed from the vessel free from any water except dissolved water. The fatty material, after proper separation, is removed through outlet 27 while water is introduced near the top of the vessel through inlet 28 to a point adjacent to the top tray of the vessel and below the separation zone. Faucets or outlets 35 may be advantageously provided near the bottom of the vessel to permit the determination of the position of the interface between the settling zone of aqueous glycerine and the fatty material. These faucets or outlets may be replaced or supplemented by a gauge glass of suitable strength and construction. Faucets or outlets 36 may also be provided at the middle and near the top of the vessel for drawing samples, and a safety valve 37 is also provided.

The vessel 22 is made of sufficient strength to withstand the high pressures and temperatures used in the process with an ample margin of safety and is advantageously made of a lower shell 29 and an upper dome 30 advantageously provided with a suitable pressure-resistant gasket 32.

Figure 2:
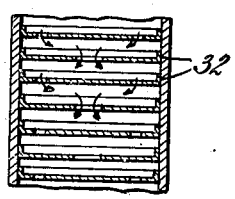
Fig. 2 is a cross-sectional view of a portion of a pressure vessel as in Fig. 1 showing a modified arrangement of trays within the vessel.

In Fig. 2 is shown another modification of the trays which may be used within the pressure vessel of Fig. 1 to provide the necessary long path for the material to insure the necessary intimacy of contact and completeness of reaction. In this modification, the holes in the trays 32 are made without rims, alternate trays being provided with openings near the outer periphery while the other trays are provided with openings at the center; the water thus flowing downwardly in a labyrinthal path, while the fatty material flows upwardly following a reverse path. In Fig. 2, as in Fig. 1, the trays are shown spaced apart, for convenience of illustration, but may be, e. g., one inch apart in a vessel two feet in diameter. All of the holes in the trays, which may vary in location and arrangement, may have slight lips or rims to retard the downward flow of the aqueous liquid.

Figure 3:
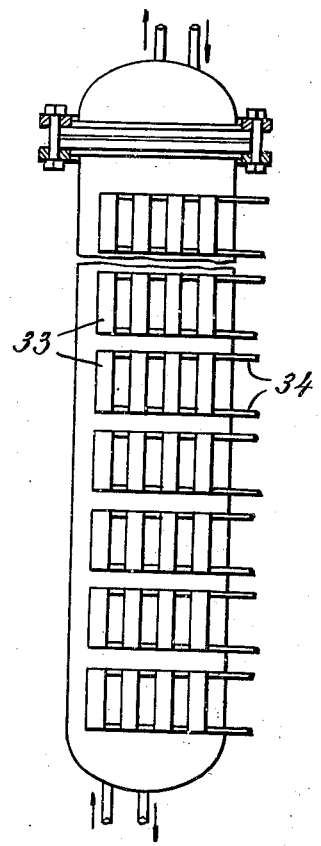
Fig. 3 is an exterior view of a pressure vessel with the insulation removed showing the positioning of the electrical heaters used to provide suitable heating to offset losses by radiation.

Fig. 3 shows an arrangement by which the pressure vessel of Fig. 1 may be heated to counterbalance losses due to radiation and the like. This figure shows how, on the exterior of the vessel, there may be provided a number of electrical heating units 33, with electric connections 34, arranged in zones, so that heat supplied to various portions of the vessels, that is, the heat supplied for example to the upper portion and to the middle portions of the vessels may be varied independently, so that heat may be supplied locally to those portions of the apparatus where it is needed while avoiding an unnecessary input of heat and avoiding overheating those portions of the apparatus where heat is not needed.

Figure 4:
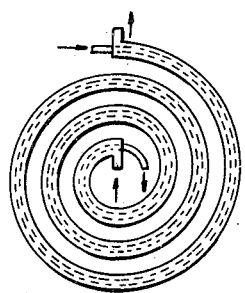
Fig. 4 is an illustration of one type of heat exchanger which may be used.
Figure 5:
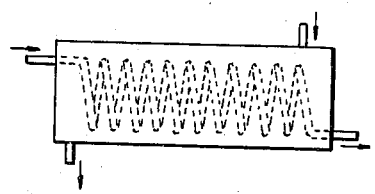
Fig. 5 illustrates a diphenyl preheater which may be used.

It is to be understood that suitable heat exchangers for the fatty material and water fed to the apparatus will be supplied, such heat exchangers as those shown in Fig. 4 being suitable, and that the material fed to the apparatus, after being preheated to use to advantage the heat contained in the fatty acids and aqueous glycerine taken from the apparatus, will be further heated by a suitable means, such as by a diphenyl heater as illustrated in Fig. 5. The apparatus will also be provided with efficient insulation to conserve heat, and with suitable thermometers, such as thermocouples, located at various places throughout the apparatus to enable the temperatures of the material in the apparatus at various points to be determined and to enable the proper control of such temperatures. The apparatus will also be provided with suitable valves for controlling the input of water and fatty material, and for maintaining the pressure within the vessels at the proper point. Suitable pumps to force the water and fatty material in under the high pressures used will be provided.

The fatty material is introduced above the settling zone 20 by means of inlet 25, and the water is introduced below the settling zone 26 by means of inlet 28. The water and fatty material thus pass through the apparatus in countercurrent flow over a long path in intimate contact. The aqueous glycerine is removed from the bottom of the settling zone 20 by means of outlet 24, and the fatty acids are removed from the top of the settling zone 26 by means of outlet 27, the hot outgoing materials then passing to suitable preheaters, such as shown in Fig. 4, where their contained heat is utilized for preheating fatty material and water fed to the apparatus.

I have described the operation as a continuous process, with water and fatty material continuously introduced into the apparatus in proper amounts, and proper proportions; and I prefer to operate the process in such continuous manner. Nevertheless, the process and apparatus may be operated in an intermittent or semi-continuous manner, with intermittent or alternate introduction of water and fatty material, within the scope of my invention in its broader aspects. Also, while I have described the invention as one involving the hydrolysis of fats and fatty oils by the use of liquid water alone, at high temperatures and pressures, it should be understood that if desired, and if unobjectionable, suitable catalysts may be used to speed up the hydrolysis.

The present application is a continuation of my prior application Serial No. 240,037, filed November 12, 1938, now abandoned, as a division of my application Serial No. 83,991, filed June 6, 1936, now Patent No. 2,139,589.

I claim:

1. Apparatus for the hydrolysis of fats and fatty oils comprising at least one pressure-resistant and corrosion-resistant elongated vertical vessel, means for introducing fatty material near the bottom of said vessel, means for introducing aqueous liquid near the top of said vessel, a space for the separation of admixed and undissolved fatty material from aqueous glycerine near the bottom of said vessel and a space in said vessel above the point of introduction of aqueous liquid for the separation of admixed and undissolved water from fatty material near the top of said vessel, means for removal of fatty material substantially free from admixed and undissolved water from fatty material, means for removal of aqueous glycerine free from admixed and undissolved fatty material from the bottom of said space provided near the bottom of said vessel for the separation of admixed and undissolved fatty material from aqueous glycerine, and a plurality of unitary heaters located along said vessel adapted to independently supply heat to various portions of the vessel whereby variations of temperatures within said various portions may be brought about or controlled.

2. The process for the hydrolysis of fats and fatty oils under pressure which comprises introducing water near the top of an elongated vertical vessel and removing aqueous glycerine from the bottom thereof, introducing fatty material near the bottom of said vessel and removing fatty acids from the top thereof, the fatty material and water being brought while under pressure and in liquid phases, into intimate contact in said vessel at a temperature of at least 200° C. at which the water has appreciable solubility in the fatty material, separating admixed and undissolved water from the fatty acids at said pressure and above the point of introduction of the water and separating admixed and undisolved fatty material from the aqueous glycerine at said pressure.

3. The process for the hydrolysis of fats and fatty oils under pressure which comprises introducing water into the upper part of an elongated vessel and removing aqueous glycerine from a layer of aqueous glycerine in the lower part of said vessel, introducing fatty material above said layer of aqueous glycerine in the lower part of said vessel and removing fatty acids from a layer of fatty material in the upper part of said vessel, the fatty material and water being brought while under pressure and in liquid phases into intimate contact in said vessel at a temperature of at least 200° C. at which water has appreciable solubility in the fatty material, separating admixed and undissolved water from fatty acids in the upper part of said vessel while under pressure, and separating admixed and undissolved fatty material from said aqueous glycerine layer in the lower part of said vessel while under pressure.

4. In a countercurrent process of hydrolyzing fatty material with water, the steps comprising causing fatty material and water to flow countercurrently in direct contact with each other through an elongated vertical vessel at a temperature above about 200° C.; introducing water and fat near the top and bottom of the column, respectively; withdrawing fatty acids and glycerine water from the top and bottom of the column, respectively; and supplying heat independently and locally to those portions of the vessel where it is needed while avoiding an unnecessary input of heat to those portions where heat is not needed.

MARTIN HILL ITTNER.

(References on following page)

REFERENCES CITED

The following references are of record in the file of this patent:

UNITED STATES PATENTS

| Number | Name | Date |
|---|---|---|
| 28,315 | Tilghman | May 15, 1860 |
| 679,575 | Reese | July 30, 1901 |
| 744,795 | Reese | Nov. 24, 1903 |
| 1,213,143 | Aylsworth | Jan. 23, 1917 |
| 1,697,738 | Suider | Jan. 1, 1929 |
| 2,009,510 | Mobley | July 30, 1935 |
| 2,116,428 | Fenske | May 3, 1938 |
| 2,148,460 | Haney | Feb. 28, 1939 |
| 2,156,863 | Mills | May 2, 1939 |
| 2,271,462 | Pfennig | June 27, 1942 |
| 2,310,986 | Murphy | Feb. 26, 1943 |

FOREIGN PATENTS

| Number | Country | Date |
|---|---|---|
| 373,897 | Great Britain | June 2, 1932 |
| 380,954 | Great Britain | Sept. 29, 1932 |